United States Patent
Araki (10) Patent No.: US 10,189,424 B2
(45) Date of Patent: Jan. 29, 2019

(54) STRUCTURE FOR CONNECTING ELECTRIC WIRES AND WIRE HARNESS

(71) Applicant: Sumitomo Wiring Systems, Ltd., Yokkaichi, Mie (JP)

(72) Inventor: Yusuke Araki, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 56 days.

(21) Appl. No.: 15/784,898

(22) Filed: Oct. 16, 2017

(65) Prior Publication Data

US 2018/0134238 A1   May 17, 2018

(30) Foreign Application Priority Data

Nov. 11, 2016   (JP) ................. 2016-220256

(51) Int. Cl.
*H01R 4/02* (2006.01)
*H01R 4/18* (2006.01)
*H01R 4/72* (2006.01)
*H02G 3/04* (2006.01)
*B60R 16/02* (2006.01)
*H01R 12/63* (2011.01)
*H02G 15/18* (2006.01)

(52) U.S. Cl.
CPC ......... *B60R 16/0215* (2013.01); *H01R 4/021* (2013.01); *H01R 4/029* (2013.01); *H01R 4/183* (2013.01); *H01R 12/63* (2013.01); *H02G 3/0462* (2013.01); *H02G 15/1806* (2013.01); *H01R 4/72* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 2,840,676 A | * | 6/1958 | King | H01R 4/56 174/75 R |
| 3,320,354 A | * | 5/1967 | Marley | H01R 4/2495 174/84 C |
| 3,332,054 A | * | 7/1967 | Fernandes | H01R 4/184 439/868 |
| 3,425,030 A | * | 1/1969 | Hadden | H01R 25/00 439/851 |
| 3,626,363 A | * | 12/1971 | McIver | H01R 4/20 439/880 |
| 3,708,611 A | * | 1/1973 | Dinger | B29C 61/0616 174/84 C |
| 3,814,139 A | * | 6/1974 | Loyd | H01R 4/72 138/141 |

(Continued)

FOREIGN PATENT DOCUMENTS

JP   2016058137 A   4/2016

*Primary Examiner* — Dimary S Lopez Cruz
*Assistant Examiner* — Muhammed Azam
(74) *Attorney, Agent, or Firm* — Reising Ethington, P.C.

(57) ABSTRACT

A structure for connecting electric wires in which a single-core conductor made of a single metal rod is connected to a flexible conductor made of a plurality of elemental metal wires and having a higher flexibility than the single-core conductor. A clamping portion formed at one end of the single-core conductor is connected to the flexible conductor with the clamping portion clamping the flexible conductor on two sides thereof in a direction transverse to the direction in which the electric wires extend.

4 Claims, 6 Drawing Sheets

(56) References Cited

U.S. PATENT DOCUMENTS

| | | | | |
|---|---|---|---|---|
| 3,889,047 A * | 6/1975 | Carver | B29C 61/00 | 156/49 |
| 3,908,267 A * | 9/1975 | Loyd | H01R 4/72 | 29/828 |
| 3,984,622 A * | 10/1976 | Ross | H01B 7/0045 | 156/51 |
| 3,984,912 A * | 10/1976 | Johnston | H01R 4/72 | 174/88 R |
| 4,129,744 A * | 12/1978 | Cunningham | H01R 4/625 | 174/94 R |
| 4,431,469 A * | 2/1984 | Falcomato | B29C 61/0616 | 138/113 |
| 4,583,069 A * | 4/1986 | Pierce | H01H 85/201 | 174/84 C |
| 4,778,948 A * | 10/1988 | Fitch | H01R 4/72 | 156/49 |
| 4,907,623 A * | 3/1990 | Kinney | H01R 4/72 | 138/103 |
| 4,917,633 A * | 4/1990 | Lacoste | H01R 4/2433 | 439/402 |
| 4,963,699 A * | 10/1990 | Urushibata | H01R 12/613 | 174/72 A |
| 4,974,798 A * | 12/1990 | Harding | H02G 3/26 | 174/72 A |
| 5,125,848 A * | 6/1992 | Zimmerly | H01R 13/5213 | 439/287 |
| 5,239,749 A * | 8/1993 | Fujimaki | H01R 4/185 | 174/84 C |
| 5,278,354 A * | 1/1994 | Lhomme | H01R 4/72 | 174/84 C |
| 5,429,532 A * | 7/1995 | Auclair | H01R 4/363 | 439/793 |
| 5,536,904 A * | 7/1996 | Kojima | H01B 7/285 | 156/48 |
| 5,597,314 A * | 1/1997 | Auclair | H01R 4/363 | 439/793 |
| 5,736,678 A * | 4/1998 | Kobayashi | H01R 4/185 | 174/176 |
| 6,674,005 B2 * | 1/2004 | Yagi | H01R 9/032 | 138/123 |
| 7,364,478 B2 * | 4/2008 | Xu | H01R 4/187 | 439/730 |
| 7,947,904 B2 * | 5/2011 | Watanabe | H01R 4/183 | 174/94 R |
| 8,609,988 B2 * | 12/2013 | Sagawa | H01R 4/023 | 174/94 R |
| 9,252,527 B2 * | 2/2016 | Aizawa | H01R 4/72 | |
| 9,302,635 B2 * | 4/2016 | Han | B60R 16/0222 | |
| 2003/0030206 A1 * | 2/2003 | Masukawa | B60R 16/0215 | 269/329 |
| 2007/0187144 A1 * | 8/2007 | Kato | B60R 16/0215 | 174/72 A |
| 2007/0215374 A1 * | 9/2007 | Ichikawa | H01R 4/72 | 174/75 C |
| 2008/0009202 A1 * | 1/2008 | Yang | H01R 4/021 | 439/787 |
| 2008/0142260 A1 * | 6/2008 | Yamaguchi | B60N 2/0224 | 174/72 A |
| 2009/0229880 A1 * | 9/2009 | Watanabe | H01R 4/183 | 174/72 A |
| 2009/0308632 A1 * | 12/2009 | Watanabe | H01B 7/20 | 174/106 R |
| 2010/0035487 A1 * | 2/2010 | Nakagawa | H01R 4/184 | 439/877 |
| 2010/0282486 A1 * | 11/2010 | Shin | H01R 4/72 | 174/85 |
| 2011/0042444 A1 * | 2/2011 | Ohnuma | H01R 4/023 | 228/110.1 |
| 2011/0048762 A1 * | 3/2011 | Sawamura | B60R 16/0207 | 174/78 |
| 2011/0162885 A1 * | 7/2011 | Yamaguchi | B60R 16/0215 | 174/72 A |
| 2011/0177728 A1 * | 7/2011 | Uchiyama | H01R 4/188 | 439/877 |
| 2012/0318575 A1 * | 12/2012 | Koto | H01R 4/185 | 174/84 C |
| 2013/0126234 A1 * | 5/2013 | Ono | H01R 4/72 | 174/75 R |
| 2014/0110459 A1 * | 4/2014 | Kataoka | H01R 4/021 | 228/111 |
| 2014/0203068 A1 * | 7/2014 | Hino | H01R 43/0207 | 228/199 |
| 2014/0238719 A1 * | 8/2014 | Inao | B60R 16/0215 | 174/112 |
| 2014/0251683 A1 * | 9/2014 | Yamamoto | B60R 16/0215 | 174/72 A |
| 2014/0284099 A1 * | 9/2014 | Saito | H01B 7/2825 | 174/70 R |
| 2014/0284100 A1 * | 9/2014 | Ichikawa | B60R 16/0215 | 174/70 R |
| 2014/0338971 A1 * | 11/2014 | Yoshida | B60R 16/0215 | 174/72 A |
| 2014/0346290 A1 * | 11/2014 | Yoshida | B60R 16/0215 | 248/74.1 |
| 2015/0008033 A1 * | 1/2015 | Toyama | B60R 16/0215 | 174/72 A |
| 2015/0021090 A1 * | 1/2015 | Mano | H01R 4/185 | 174/72 A |
| 2015/0034354 A1 * | 2/2015 | Yoshida | B60R 16/0215 | 174/68.3 |
| 2015/0083462 A1 * | 3/2015 | Yoshida | F16B 2/06 | 174/136 |
| 2015/0122544 A1 * | 5/2015 | Shiba | H01R 4/70 | 174/72 A |
| 2015/0229039 A1 * | 8/2015 | Kawamura | H01R 4/20 | 174/72 A |
| 2015/0244159 A1 * | 8/2015 | Seifert | H02G 15/04 | 174/77 R |
| 2015/0270696 A1 * | 9/2015 | Wakabayashi | H02G 3/0468 | 174/72 A |
| 2015/0294768 A1 * | 10/2015 | Sakaki | B60R 16/0207 | 174/68.3 |
| 2015/0340848 A1 * | 11/2015 | Nakashima | C08G 18/4825 | 174/72 A |
| 2015/0355213 A1 * | 12/2015 | Kobayashi | G01P 1/026 | 324/207.25 |
| 2015/0364233 A1 * | 12/2015 | Asami | H01R 43/005 | 29/869 |
| 2016/0071630 A1 * | 3/2016 | Sugino | H02G 15/1806 | 174/68.3 |
| 2016/0101747 A1 * | 4/2016 | Inao | B60R 16/0215 | 174/72 A |
| 2016/0126709 A1 * | 5/2016 | Maeda | H02G 3/0462 | 174/68.3 |
| 2018/0134238 A1 * | 5/2018 | Araki | H01R 4/029 | |

* cited by examiner

STRUCTURE FOR CONNECTING ELECTRIC WIRES AND WIRE HARNESS

CROSS REFERENCE TO RELATED APPLICATIONS

This application claims the priority of Japanese patent application JP2016-220256 filed on Nov. 11, 2016, the entire contents of which are incorporated herein.

TECHNICAL FIELD

The present invention relates to a structure for connecting electric wires and a wire harness in which the structure is employed.

BACKGROUND ART

Wire harnesses mounted in vehicles, such as hybrid cars and electric cars, have been conventionally known in which a single-core wire formed by wrapping a single-core conductor made of a single metal rod with an insulating coating is connected, for example, to a stranded wire formed by wrapping a stranded conductor made of a plurality of stranded elemental metal wires with an insulating coating. For example, JP 2016-58137A describes a wire harness in which single-core wires are connected to stranded wires such that, when mounted in a vehicle, the single-core wires are used in the regions where no flexibility is required and the stranded wires are used in the regions where flexibility is required for connection with pieces of equipment. The single-core conductor exposed at a terminal portion of each single-core wire by stripping the insulating coating therefrom is placed on the stranded conductor exposed at a terminal portion of a stranded wire by stripping the insulating coating therefrom in a direction transverse to the elongated direction of both wires, and the single-core wire and the stranded wire are connected by ultrasonic welding.

JP 2016-58137A is an example of related art.

SUMMARY

However, while the above-described connection of electric wires may be robust against forces exerted in the elongated direction of the wires, it tends to be vulnerable to forces transversal to the elongated direction of the wires (i.e., "peeling force"). Moreover, electric wires with a high flexibility, such as the above-described stranded wires, are susceptible to deflection, which may in turn exert a peeling force on the connection. Measures against this have been desired as peeling may occur at the connection if peeling force is applied to the connection.

The present design has been made in the light of the above-described circumstances and its object is to provide a structure for connecting electric wires and a wire harness that enhance the adhering strength of the connection.

A structure for connecting electric wires according to the present design is provided, in which a single-core conductor made of a single metal rod is connected to a flexible conductor made of a plurality of elemental metal wires and having a higher flexibility than the single-core conductor, the flexible conductor being connected to single-core conductor, wherein a clamping portion formed at one end of the single-core conductor is connected to the flexible conductor with the clamping portion clamping the flexible conductor on two sides thereof in a direction transverse to the direction in which the electric wires extend.

In one aspect of the present design, a wire harness comprises: a single-core conductor made of a single metal rod; a flexible conductor made of a plurality of elemental metal wires and having a higher flexibility than the single-core conductor; and the foregoing structure for connecting electric wires.

The present design can enhance the adhering strength of the connection between electric wires as the flexible conductor and the single-core conductor do not peel off from each other even if the flexible conductor deflects.

EMBODIMENTS

Preferred embodiments will be described hereinafter.

According to one aspect of the structure for connecting electric wires of the present design, the clamping portion may be formed by defining a splitting plane axially from an end face of the single-core conductor to slit the end of the single-core conductor into a plurality of parts.

According to another aspect of the structure for connecting electric wires of the present design, the clamping portion may be formed by making a hole in an end face of the single-core conductor.

Embodiment 1

Embodiment 1 will be described hereinafter with reference to FIGS. 1-11.

Figure 1:
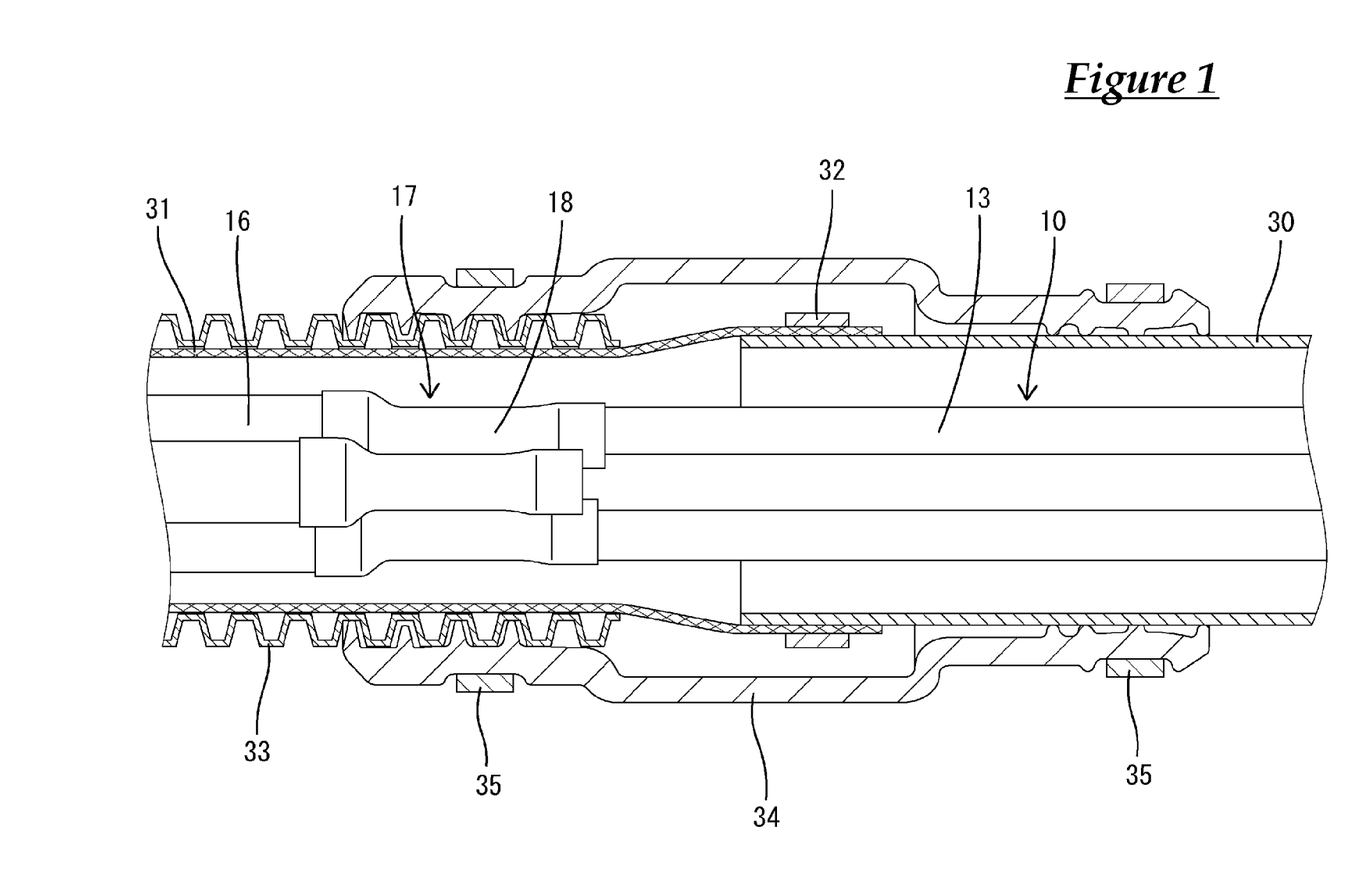
FIG. 1 is a cross-sectional view of the wire harness of Embodiment 1, enlarging the vicinity of the wire connection.

The wire harness according to this embodiment is mounted on board of vehicles, such as hybrid cars, by being connected between equipment installed in the front of the vehicle and equipment installed in the rear of the vehicle. The wire harness of this embodiment includes a plurality (three in this embodiment) of conductive wires 10.

All the conductive wires 10 are passed through a shield pipe 30 mounted on the underside of the floor of the vehicle. Most of the shield pipe 30 extends longitudinally along the underside of the vehicle floor with the front and rear ends of the shield pipe 30 disposed in the cabin. The shield pipe 30 is an elongated piece of a piping material made of metal (for example, aluminum or aluminum alloy). The shield pipe 30 has a circular cross section and is bent to conform to the predetermined piping route.

A braided member 31 is connected to each of the front and rear ends of the shield pipe 30 so that the entire length of the conductive wires 10 is shielded from noise by being surrounded by the shield pipe 30 or the braided members 31. Each braided member 31 is made of conductive metal elemental wires braided into a tube and has an excellent flexibility. The braided member 31 is crimped to the ends of the shield pipe 30 with crimping rings 32.

The braided member 31 is protected by an outer jacket 33 having an excellent flexibility and fitted around the braided member 31. The outer jacket 33 can be formed, for example, from a corrugated tube made of a synthetic resin.

A grommet 34 is fitted on the wire harness, spanning the outer jacket 33 and the shield pipe 30. The grommet 34 is made of a rubber material formed into a tube with one end thereof in intimate contact with the shield pipe 30 and the other end thereof also in intimate contact with the outer jacket 33. The grommet 34 is secured to the shield pipe 30 and the outer jacket 33 by tightening fastener members 35, such as tie bands, around the shield pipe 30 and the outer jacket 33.

Each conductive wire 10 includes a single-core wire 13 formed by wrapping a single-core conductor 11 made of a single metal rod (core) with an insulating coating 12 and a stranded wire (i.e., flexible wire) 16 formed by wrapping a stranded conductor (i.e., flexible conductor) 14 made of a plurality of stranded elemental metal wires with an insulating coating 15, the stranded wire 16 being connected with the single-core wire 13 in the lengthwise direction of the wires. The single-core conductor 11 is made of copper, copper alloy, aluminum, or aluminum alloy formed to have a circular cross section. The stranded conductor 14 is made of copper, copper alloy, aluminum, or aluminum alloy and has a higher flexibility than the single core conductor 11. The stranded wire 16 has an outer diameter that is greater than that of the single-core wire 13.

The conductive wire 10 has a connection portion 17 in which the single-core conductor 11 exposed at a terminal portion of the single-core wire 13 by stripping the insulating coating 12 therefrom is connected to the stranded conductor 14 exposed at a terminal portion of the stranded wire 16 by stripping the insulating coating 15 therefrom. The connection portion 17 is covered with a protective tube 18, such as a heat-shrinkable tube.

Figure 2:
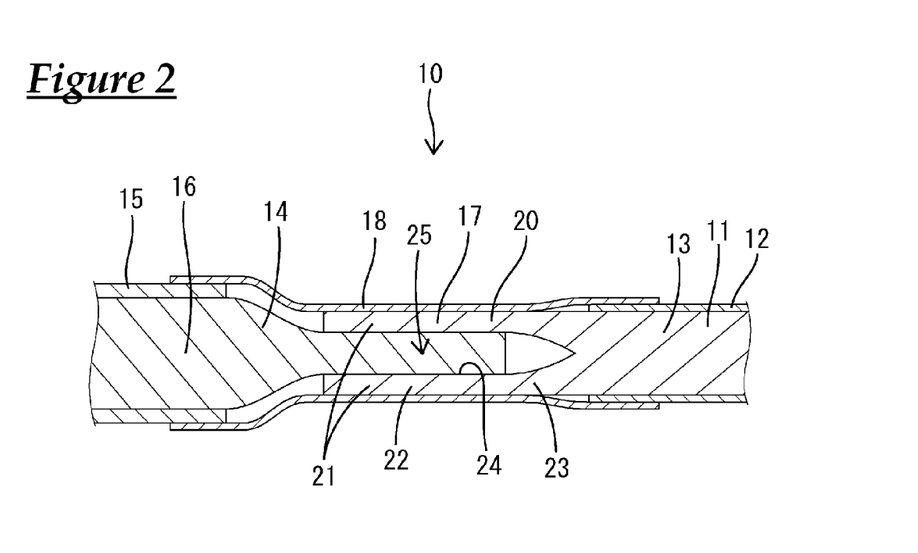
FIG. 2 is an enlarged cross-sectional view of the wire connection.

As shown in FIG. 2, the single-core conductor 11 and the stranded conductor 14 are connected to each other with a clamping portion 20 that is formed at one end of the single-core conductor 11 clamping the stranded conductor 14 on two sides thereof in a direction transverse to the elongated direction of the wires.

The clamping portion 20 is formed by defining a splitting plane extending axially from an end face of the single-core conductor 11 and slitting the end of the single-core conductor 11 into a plurality (two according to this embodiment) of parts. The splitting plane is defined through the diametrical center of the single-core conductor 11 and diametrically splits the end of the single-core conductor 11 into two parts. The clamping portion 20 is formed symmetrically with respect to a centerline of the single-core conductor 11.

Figure 3:
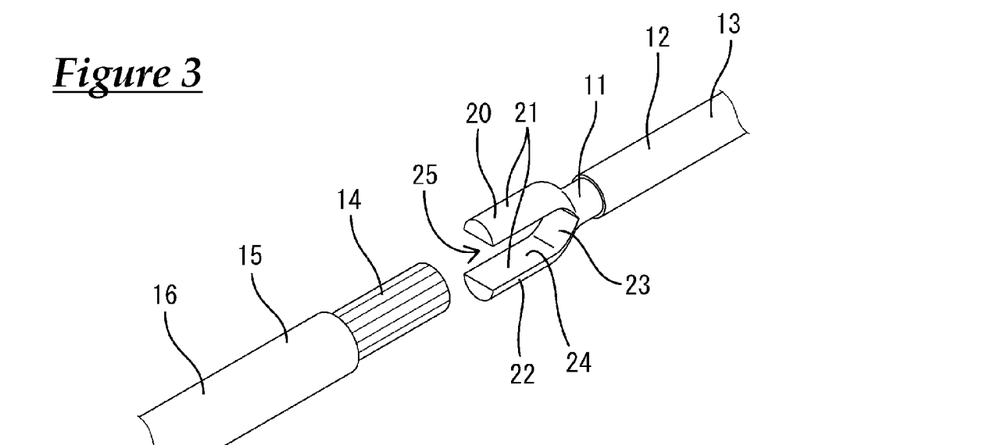
FIG. 3 is a perspective view showing the single-core wire and the stranded wire prior to their connection.
Figure 4:
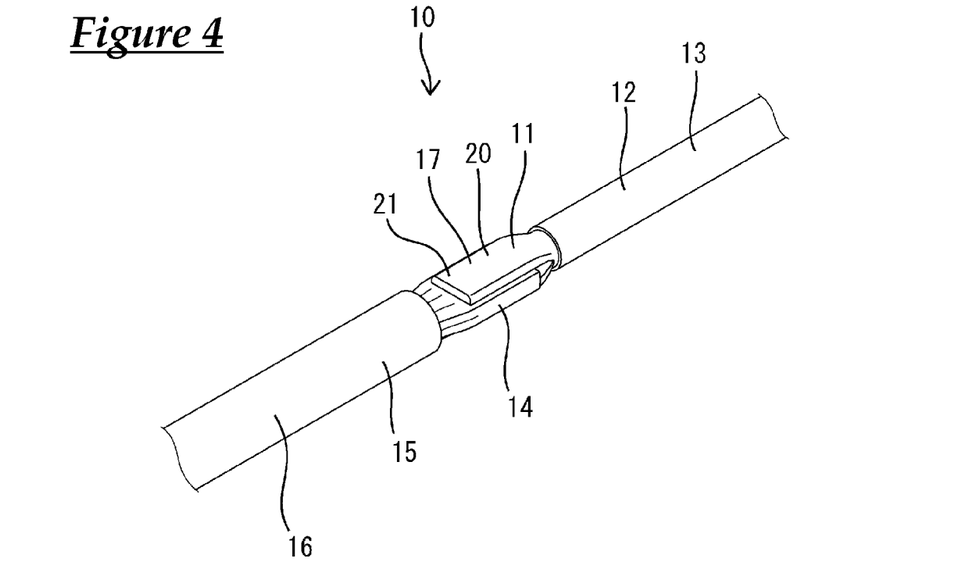
FIG. 4 is a perspective view showing the connection between the single-core wire and the stranded wire.

The clamping portion 20 has a pair of clamping pieces 21 for clamping the stranded conductor 14 therebetween (see FIG. 3). Before being connected to the stranded conductor 14, each of the clamping pieces 21 has an approximate semicircular cross section formed by slitting the single-core conductor 11 into two halves. Each clamping piece 21 has an opposing portion 22 that extends approximate in parallel with that of the other clamping piece 21 and also has an inclined portion 23 inclined from the opposing portion 22 toward the center of the single-core conductor 11. The opposing surfaces of the opposing portions 22 of the clamping pieces 21 serve as connecting surfaces 24 for connection with the stranded conductor 14. The connecting surfaces 24 of the clamping pieces 21 are flat surfaces that extend approximate in parallel with each other. Prior to connection, the width of the connecting surfaces 24 is formed to be equal to the diameter of the single-core conductor 11.

Formed between the clamping pieces 21 is an insertion space 25 into which the stranded conductor 14 is inserted. The insertion space 25 is open both to the front end and to the left and right of the single-core conductor 11. The insertion space 25 is sized to match the diameter (i.e., thickness) of the stranded conductor 14.

The following describes an exemplary operation to connect a single-core wire 13 with a stranded wire 16.

First, a clamping portion 20 is formed at the end of the single-core conductor 11. Specifically, the insulating coating 12 is stripped or otherwise removed from the terminal portion of the single-core wire 13 and the exposed end of the single-core conductor 11 is split into two to form a clamping portion 20. Then, the insulating coating 15 is stripped or otherwise removed from the terminal portion of the stranded wire 16 to expose the stranded conductor 14.

Figure 5:
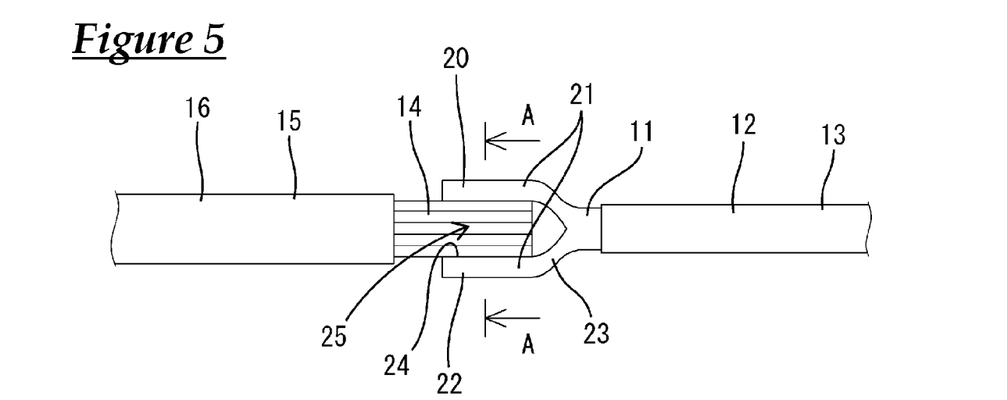
FIG. 5 is a side view showing the stranded conductor inserted into the clamping portion of the single-core conductor.
Figure 6:
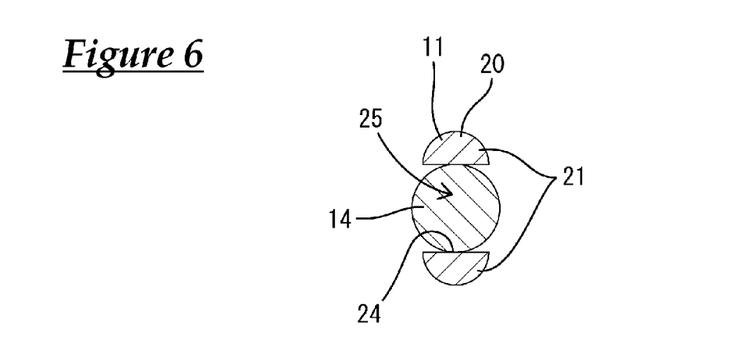
FIG. 6 is a cross-sectional view showing the stranded conductor inserted into the clamping portion of the single-core conductor, corresponding to the cross section taken along line A-A of FIG. 5.

Next, as shown in FIGS. 5 and 6, the end of the stranded conductor 14 is inserted into the insertion space 25 defined between the clamping pieces 21. The end of the stranded conductor 14 is inserted fully into the insertion space 25 to be disposed between the opposing portions 22.

Figure 7:
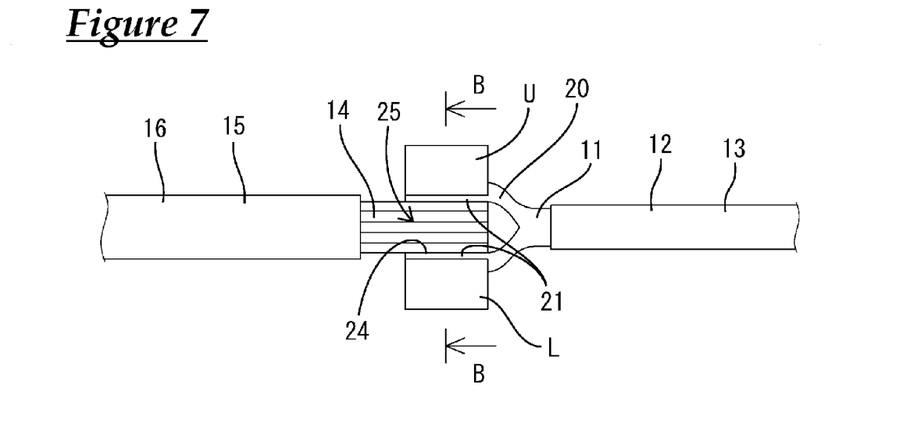
FIG. 7 is a side view showing the stranded conductor and the single-core conductor set in a die with the stranded conductor inserted into the clamping portion of the single-core conductor.
Figure 8:
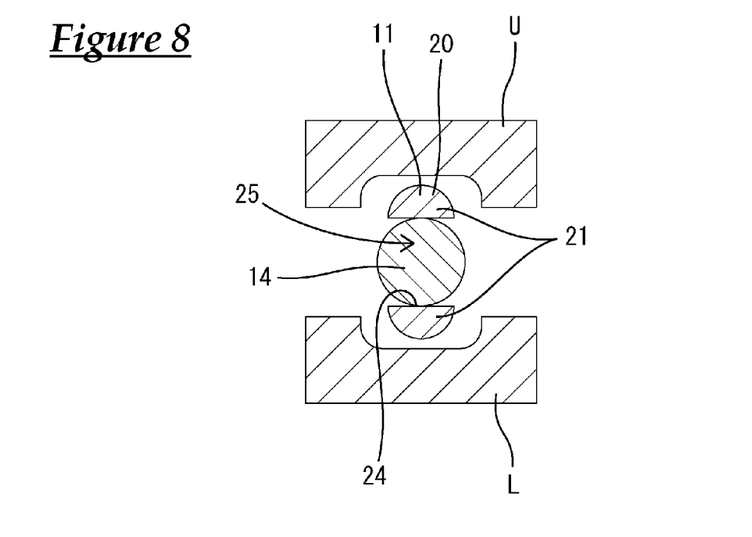
FIG. 8 is a cross-sectional view showing the stranded conductor and the single-core conductor set in a die with the stranded conductor inserted into the clamping portion of the single-core conductor, corresponding to the cross section taken along line B-B of FIG. 7.

Then, the single-core conductor 11 and the stranded conductor 14 are crimped together. Specifically, the end of the stranded conductor 14 is interposed between the upper die U and the lower die L of a crimping machine while it is inserted in the insertion space 25 as shown in FIGS. 7 and 8. At this step, the clamping pieces 21 are oriented to vertically oppose each other between the upper die U and the lower die L.

Figure 9:
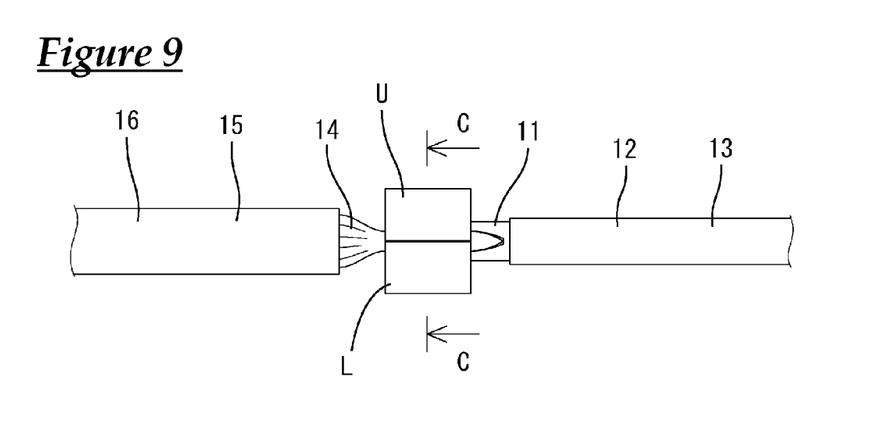
FIG. 9 is a side view showing the single-core conductor crimped to the stranded conductor by closing the die.
Figure 10:
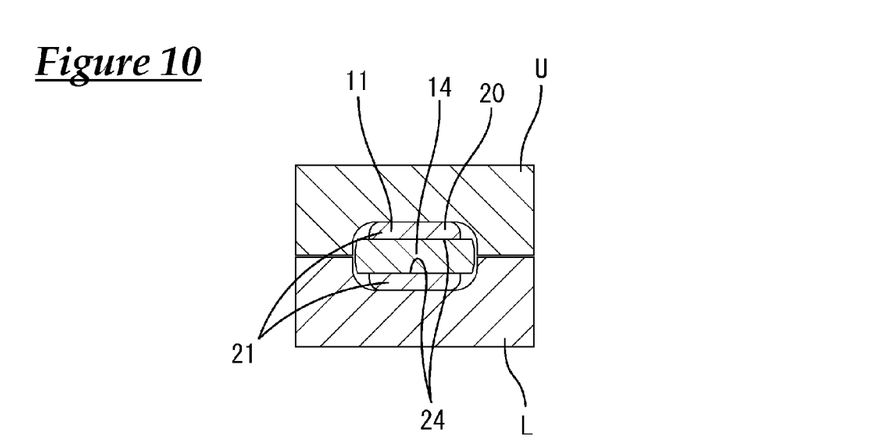
FIG. 10 is a cross-sectional view showing the single-core conductor crimped to the stranded conductor by closing the die, corresponding to the cross section taken along line C-C of FIG. 9.

As shown in FIGS. 9 and 10, as the gap between the upper die U and the lower die L is narrowed to clamp the clamping portion 20, the upper and lower surfaces of the clamping pieces 21 are flattened to conform to the shapes of the upper die U and the lower die L, so that the clamped elements become generally tabular with the stranded conductor 14 compressed and flattened. The compressed and flattened stranded conductor 14 juts out laterally or widthwise from both sides of the clamping portion 20. The connecting surfaces 24 of the clamping portion 20 are widened laterally on both sides thereof, crimping the entire connecting surfaces 24 to the stranded conductor 14. In this way, the single-core conductor 11 and the stranded conductor 14 are connected to each other by crimping.

Figure 11:
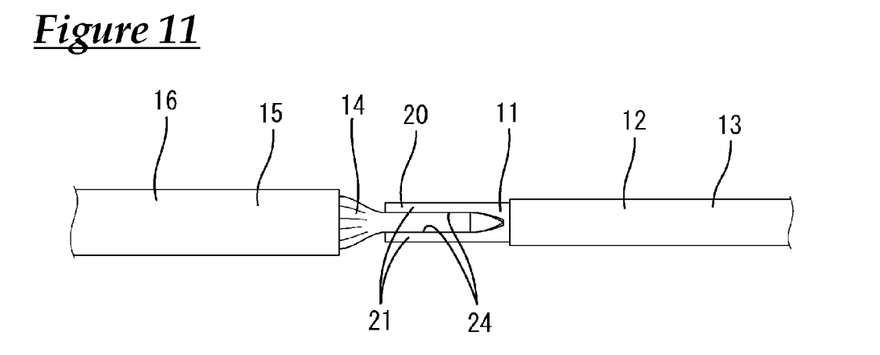
FIG. 11 is a side view showing the single-core conductor crimped to the stranded conductor.

This completes the operation to connect the single-core wire 13 and the stranded wire 16. As shown in FIG. 11, the vertical dimension of the connection portion 17 (the dimension of the clamping pieces 21 and the stranded conductor 14 in the direction in which they are set on each other) is equal to the diameter of the single-core conductor 11.

Next, the effect of this embodiment configured as described above will be described.

In the structure for connecting electric wires according to this embodiment, the clamping portion 20 formed at one end of the single-core conductor 11 is connected to the stranded conductor 14 with the clamping portion 20 clamping the stranded conductor 14 on two sides thereof in a direction transverse to the direction in which the electric wires 13 and 16 extend. According to this structure, even if the stranded conductor 14 is deflected, as the stranded conductor 14 is clamped between a pair of clamping pieces 21, the single-core conductor 11 can be prevented from peeling off of the stranded conductor 14.

Embodiment 2

Figure 12:
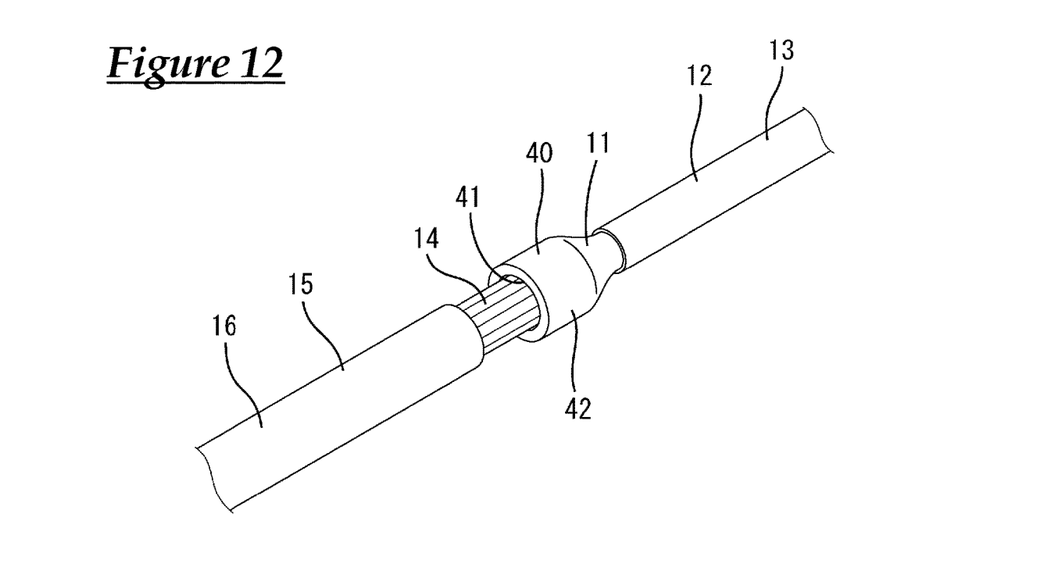
FIG. 12 is a perspective view of a wire connection according to Embodiment 2, showing a stranded conductor inserted into a clamping portion of a single-core conductor.
Figure 13:
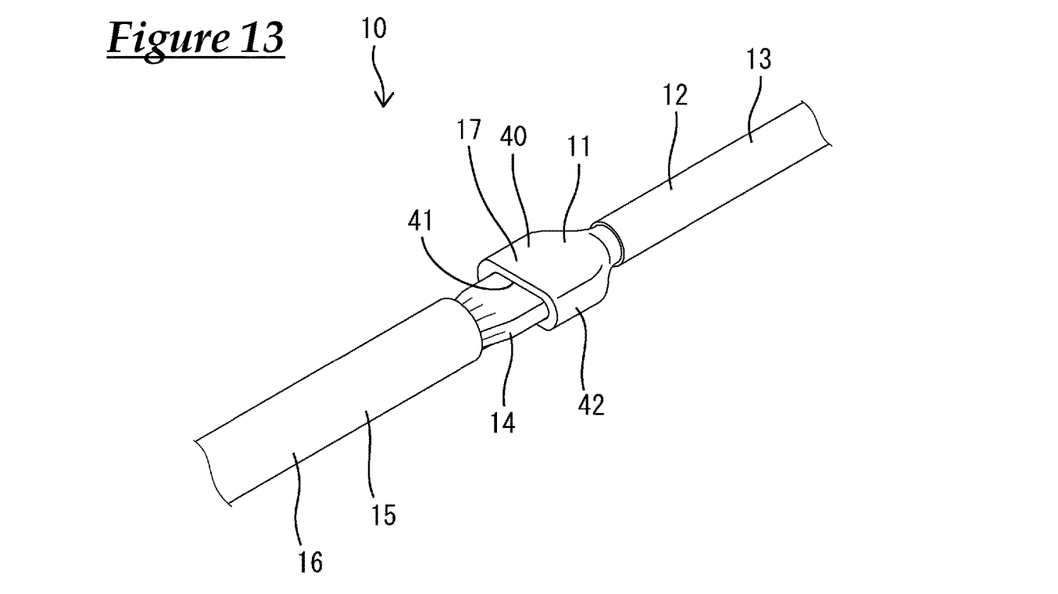
FIG. 13 is a perspective view showing the single-core conductor crimped to the stranded conductor.

A wire harness of Embodiment 2 according to the present design will be described hereinafter with reference to FIGS. 12-13.

The structure for connecting electric wires according to this embodiment differs from Embodiment 1 in that the clamping portion 40 of this embodiment is formed by opening a hole 41 in the end face of the single-core conductor 11. Note that components identical to those described with respect to Embodiment 1 are assigned identical designations and description thereof is omitted herein.

As in Embodiment 1, the wire harness according to this embodiment comprises a conductive wire 10 formed by connecting a single-core wire 13 including a single-core conductor 11 made of a single metal rod with a stranded wire 16 including a stranded conductor 14 made of a plurality of elemental metal wires. The clamping portion 40 formed at one end of the single-core conductor 11 is connected to the stranded conductor 14 with the clamping portion 40 clamping the stranded conductor 14 on two sides thereof in a direction transverse to the direction in which the electric wires 13 and 16 extend.

The clamping portion 40 is formed by making a hole 41 in the end face of the single-core conductor 11. The hole 41 is formed at the diametrical center of the single-core conductor 11, having a circular shape concentric with the single-core conductor 11. The diameter of the hole 41 is formed to be equal to the outer diameter of the stranded conductor 14. The hole 41 is formed to a predetermined depth, extending linearly from its open end to the inner end. The inner circumferential surface of the hole 41 is formed as the connecting surface for connection with approximately the entire circumference of the stranded conductor 14.

The clamping portion 40 includes a clamping tube 42 having a generally cylindrical or tubular shape due to the hole 41 formed through the center of the single-core conductor 11. The clamping tube 42 is one size larger than the other portions of the single-core conductor 11.

First, a clamping portion 40 is formed at one end of the single-core conductor 11 in order to connect the single-core conductor 11 and the stranded conductor 14. The clamping portion 40 is formed by first boring a circular hole in one end of the single-core conductor 11 and then gradually increasing (i.e., enlarging and expanding) its diameter. Next, after one end of the stranded conductor 14 is inserted to the inner end of the hole 41, the clamping portion 40 is set in a die and compressed. The clamping tube 42 is flattened to conform to the shape of the die while the stranded conductor 14 inserted in the hole 41 is also compressed and flattened, thus providing a generally tubular-shaped connection portion 17. In this way, the single-core conductor 11 and the stranded conductor 14 are connected to each other by crimping.

As described above, according to this embodiment, as in Embodiment 1, the clamping portion 40 formed at one end of the single-core conductor 11 is connected to the stranded conductor 14 with the clamping portion 40 clamping the stranded conductor 14 on two sides thereof in a direction transverse to the direction in which the electric wires 13 and 16 extend. Accordingly, even if the stranded conductor 14 is deflected, the single-core conductor 11 can be prevented from peeling off from the stranded conductor 14.

Other Embodiments

The present invention is not limited to the embodiments described by the above description and the drawings. For example, other embodiments, which will be described below, also fall under the technical scope of the present invention.

In the foregoing embodiments, the single-core conductor 11 and the stranded conductor 14 are connected to each other by crimping. However, the present invention is not so limited; for example, these conductors may alternatively be connected by ultrasonic welding.

In the foregoing embodiments, although a stranded conductor 14 is used as the flexible conductor, the present invention is not so limited; for example, the flexible conductor may also be a braided wire formed by weaving a large number of elemental metal wires.

In the foregoing Embodiment 1, the clamping portion 20 is formed by splitting the single-core conductor 11 into two parts. However, the present invention is not so limited; for example, one end of the single-core conductor may be split into three or more parts by radially dividing the single-core conductor from its centerline so as to form a clamping portion.

In the foregoing Embodiment 1, a split plane is defined through the diametrical center of the single-core conductor 11. However, the present invention is not so limited; for example, a split plane may be defined at an off-center location closer to one side of the single-core conductor 11.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 Single-core conductor
13 Single-core wire
14 Stranded conductor (Flexible conductor)
16 Stranded wire (Flexible wire)
20, 40 Clamping portion
41 Hole

What is claimed is:
1. A structure for connecting electric wires, comprising:
a single-core conductor made of a single metal rod includes a single-core wire and an insulating coating wrapped around the single-core wire, the insulating coating is stripped from one end of the single-core wire so as to expose a terminal portion;
a flexible conductor made of a plurality of elemental metal wires includes a stranded wire and an insulating coating wrapped around the stranded wire, the insulating coating is stripped from one end of the stranded wire so as to expose a terminal portion, and the flexible conductor has a higher flexibility than the single-core conductor,
wherein a clamping portion is integrally formed at the one end of the single-core conductor so that it is made from the same single metal rod, the flexible conductor is inserted into the clamping portion and is clamped on two sides thereof in a direction transverse to a direction in which the electric wires extend so that the flexible conductor and the single-core conductor are connected together.
2. The structure for connecting electric wires according to claim 1, wherein the clamping portion is formed by defining a splitting plane axially from an end face of the single-core conductor to slit the end of the single-core conductor into a plurality of parts.
3. The structure for connecting electric wires according to claim 1, wherein the clamping portion is formed by making a hole in an end face of the single-core conductor.
4. A wire harness structure, comprising:
the structure for connecting electric wires according to claim 1.

* * * * *